March 26, 1957 G. D. FORBES 2,786,961
CATHODE-RAY DEFLECTION CIRCUIT
Filed July 24, 1952
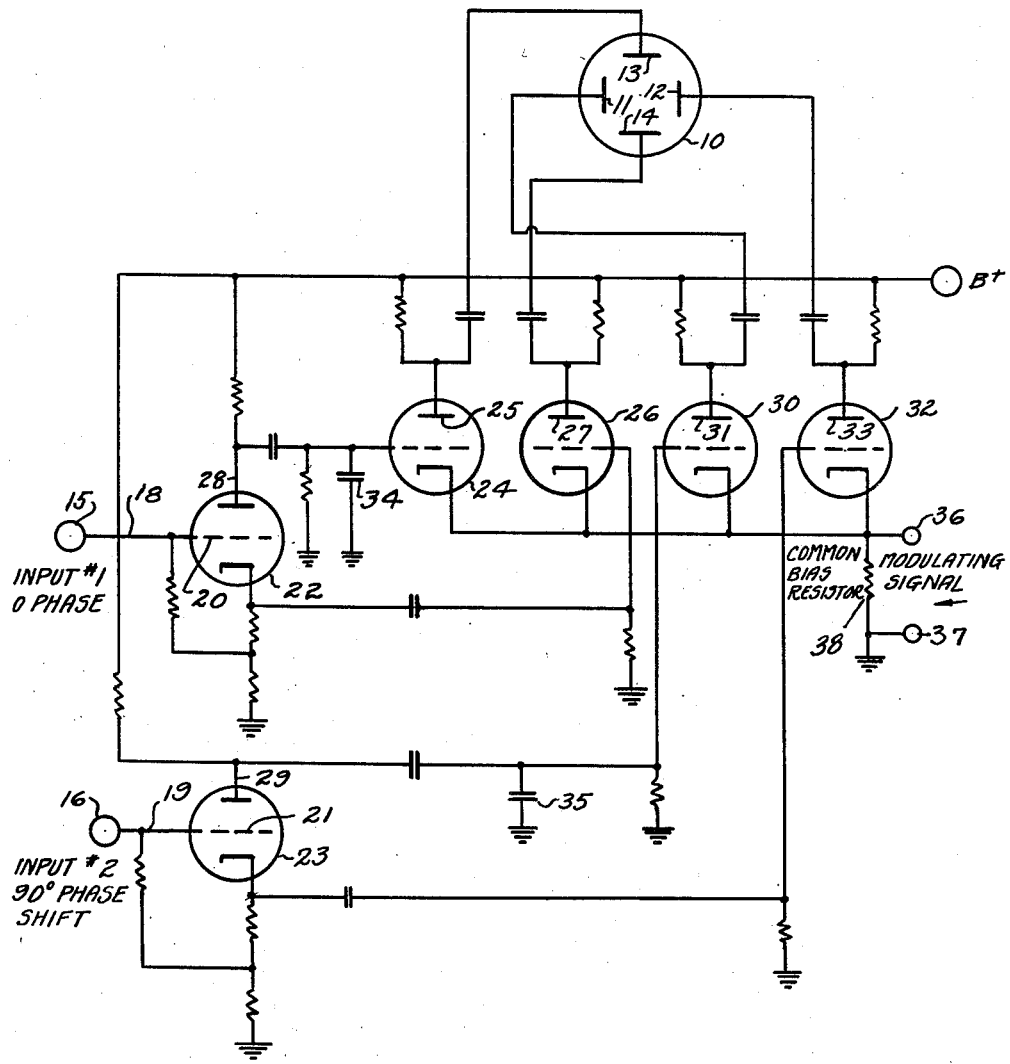
INVENTOR.
GORDON D. FORBES
BY Wade Koontz AND
Orlando Z. McCoy
ATTORNEYS

United States Patent Office 2,786,961
Patented Mar. 26, 1957

2,786,961

CATHODE-RAY DEFLECTION CIRCUIT

Gordon Donald Forbes, Sudbury, Mass.

Application July 24, 1952, Serial No. 300,581

6 Claims. (Cl. 315—24)

This invention relates to an improved cathode-ray deflection circuit for imparting a radial displacement to a curve sweep on a cathode-ray tube screen.

It is a well-known expedient in the prior art that where it is desirable to obtain a long time base in a cathode-ray tube presentation, to employ a circular or spiral sweep if two constant amplitude sine wave input voltages are applied to the vertical and horizontal sweep voltage inputs of a cathode-ray oscillograph and the sine wave inputs vary in phase by ninety degrees with respect to each other, the cathode-ray beam will trace a circular pattern on the cathode-ray tube screen. By modulating the sweep voltages by a signal voltage the circular trace will be radially deflected to depict the signal desired to be presented. If the sine wave input voltages, in addition to being ninety degrees shifted in phase with respect to each other, are applied as a damped wave train increasing from zero to a maximum amplitude or vice versa, a spiral sweep of the cathode-ray beam will be accomplished, in one case the spiral trace having its origin at the center of the tube and in the other case having its origin at the periphery of the tube screen. In general it is, therefore, necessary in order to develop a curved cathode-ray tube sweep, to employ an oscillator for the purpose of generating the sweep voltages, the output of the oscillator being divided into two inputs, one of the inputs being passed through a phase shifting network to shift its phase ninety degrees with respect to the other input voltage and these sweep voltages if of constant amplitude can then be applied to the cathode-ray tube to produce a circular trace which may be modulated radially to present the signals to be indicated. Similarly if a noncircular trace is desired, an oscillator capable of having a damped sine wave train output is employed in lieu of constant amplitude oscillations and in this case a spiral trace will be generated as described above. By varying the relationship of the amplitudes of the input sweep voltages, it is possible to obtain other types of curved sweeps, such as elliptical sweeps, as may be desired. The method of generating these types of sweep voltages is already well-known in the art and will not be described in conjunction with the present invention.

Sine wave sweep voltages of constant amplitude or suitable damped trains of input voltage waves will be assumed to be available for use with respect to the invention and with the phase of one of the inputs shifted by ninety degrees with respect to the other input sweep voltage.

Previous radial modulation systems employed in conjunction with circular, or other type, curved sweep cathode-ray presentations have generally employed a push-pull transformer for dividing the respective input sweep voltages into two voltages, 180 degrees apart in phase, which are applied for example to the vertical deflection plates of the cathode-ray tube and a similar means has been employed for developing the requisite voltages for the horizontal deflection plane. In another type of circuitry multigrid tubes have been employed, or an electrode placed at the center of the cathode-ray screen has been employed. These older known systems have suffered serious disadvantages in that the radial deflection sensitivity is inversely proportional to the distance from the center of the screen and as well with lesser disadvantages such as considerable added expense. Where a spiral sweep is generated by the use of damped wave trains as above briefly described, the transformer used to couple the sweep voltages to amplifiers connected to the respective deflection plates has made it difficult to obtain the necessary transient response to the damped wave trains except where very special and expensive transformers are employed. Where multigrid tubes are used it is almost impossible to realize the high order of balance required over appreciable deflections with the result that the beam trace is distorted and may bend back upon itself, cross over and even double up into loops. Difficulty is also encountered where multigrid tubes are employed because of drift due to the continually varying ratio of plate to screen grid current. This means that balanced conditions over even small ranges of amplitude can not be maintained over a reasonable period of time. For this reason even carefully selected multigrid tubes are unsatisfactory. The use of an additional electrode in the cathode-ray tube is also prohibitive from a cost standpoint.

In accordance with the present invention a simple means has been devised employing simple triode vacuum tubes to develop the necessary deflection voltages for deflecting plates of the cathode-ray tubes which is low in cost and avoids or minimizes the difficulties encountered with previously employed circuits for accomplishing a curved sweep on a cathode-ray tube screen. In accordance with the present invention two input sweep voltages differing in phase by ninety degrees are applied respectively to the grids of a pair of triode vacuum tubes. Each of these tubes has coupled therewith an amplifier tube connected in the plate circuit of the input tube and a second amplifier tube connected to the cathode of the input tube, with the plate circuits of the amplifier tubes respectively connected to an opposed pair of deflection plates in the cathode-ray tube. Since the grid of one of the amplifier tubes associated with each respective input tube has its grid connected in the plate circuit, while the other amplifier tube has its grid connected as a cathode follower, voltage outputs of the amplifier tubes are always one hundred eighty degrees out of phase with respect to each other. Two pairs of voltages thus differing one hundred eighty degrees in phase with respect to each other and ninety degrees between each of the pairs of voltages is available for applying to the deflection plates of the cathode-ray tube to provide the necessary curved sweep which may be either circular or spiral depending upon the nature of the amplitudes of the input sweep voltages. The invention further employs a common source of potential for the plates of all of the amplifier tubes and the cathodes of all of the amplifier tubes are coupled together in series with a common bias resistor to provide a definite bias voltage above the ground so that an input signal to be displayed on the cathode-ray tube can be applied across the common ground resistor to modulate the resultant of the sweep voltages at any instance to cause a radial deflection of the cathode-ray beam trace. Other features of the invention will become apparent by reference to the accompanying drawing and to the detailed description hereinafter given.

In the circuit illustrated in the drawing a curved trace which may be circular, spiral, elliptical or otherwise as desired, is applied to the screen of the cathode-ray tube 10. The cathode-ray tube 10 is provided with horizontal deflecting plates 11 and 12 and vertical deflecting plates 13 and 14 to which the sweep voltages are applied to cause the desired curved beam trace. Input signals which may be sine waves of constant amplitude or damped trains of sine wave voltages are applied to the input sweep voltage terminals of the circuit. The input voltages necessarily are presumed to be supplied with a shift in phase of one of the voltages by ninety degrees with respect to the other voltages and any suitable well-known source for deriving such sweep voltages may be employed.

The input sweep voltages may have their parameters so chosen that the amplitude of the sweep voltages may be constant or may vary in a known predetermined manner to give the type of curve sweep desired such as circular, elliptical, spiral or other shapes.

The respective input sweep voltages applied to terminals 15 and 16 are applied by means of conductors 18 and 19 to the grids 20 and 21 of the triode vacuum tubes 22 and 23, respectively. The plate 28 of the tube 22 is suitably connected by means of a suitable load resistance to a source of plate potential, and the plate is also capacitively coupled to the grid of an amplifier tube 24 which has its plate 25 connected to the source of plate current and capacitatively coupled to the vertical deflection plate 13 of the cathode-ray tube 10. The first input tube 22 has its cathode connected by means of a suitable biasing resistor to ground which is the return side of high voltage source of plate current. The second amplifier tube 26 has its grid connected as a cathode follower to the cathode of the tube 22 and has its plate 27 connected to the source of plate potential and capacitatively coupled to the opposite vertical deflection plate 14 of the cathode-ray tube 10.

The tubes 24 and 26, respectively, serve as amplifier tubes and the voltage on the grid of tube 24 will also be a hundred eighty degrees out of phase with respect to the sweep voltage appearing on the grid 20 of the tube 22, while the voltage on the grid of amplifier tube 26 will be in phase with the voltage on the grid of input tube 22 and accordingly the plate voltages of the amplifier tubes 24 and 26 and the voltages appearing at the vertical deflection plates 13 and 14 will be one hundred eighty degrees out of phase with respect to each other which is desired for proper operation of the cathode-ray tube.

Similarly, the vacuum tube 23 connected to the second input sweep voltage at terminal 16 has its plate 29 connected to the common source of plate voltage and also capacitatively coupled to the grids of the third amplifier tube 30 which has its plate circuit 31 connected to the common source of plate voltages and capacitatively coupled to the horizontal deflection plate 11 of the cathode-ray tube 10. Similar to the tube 22, the second input tube 23 has its cathode connected to ground across suitable bias resistors and also capacitatively coupled to the grid of the fourth amplifier tube 32, which similarly has its plate circuit 33 connected to the common source of plate potential and to the second horizontal deflection plate 12 of the cathode-ray tube 10. The voltages appearing on the grids of tubes 30 and 32 and on the horizontal deflection plates 11 and 12 of the cathode-ray tube 10 will respectively be 180 degrees out of phase with respect to each other for the same reasons described above with respect to the input tube 22; and also these voltages will have been ninety degrees out of phase, respectively, with the voltages appearing on the vertical deflection plates 13 and 14 due to the fact that the input sweep voltage applied to terminal 16 is ninety degrees shifted in phase with respect to the input voltage applied to the input terminal 15. As will be noted in the drawing the plate circuit of all of the tubes are connected in common through suitable load resistors to a single source of plate potential and in addition capacitors 34 and 35 connected across the plate outputs of tubes 22 and 23 are provided to reduce any grid cathode coupling which might otherwise unbalance the system.

In the circuit as so far described it will be understood that if two input sweep voltages differing in phase with respect to each other by ninety degrees are applied, the input sweep voltages at the respective input terminals 15 and 16 will cause the tubes 22 and 23 to conduct and apply corresponding signal voltages to the grids of amplifier tubes 24 and 26, which voltages will be 180 degrees out of phase with respect to each other due to the fact that the grid of tube 24 is connected in the plate circuit of tube 22 while the grid of tube 26 is coupled to the cathode of tube 22. The voltages appearing in the plate circuits of the amplifier tubes 24 and 26 will accordingly appear across the vertical deflection plates 13 and 14 of the cathode-ray tube. In a similar manner the phase shifted input sweep voltage applied to the terminal 16 will cause tube 23 to conduct, the plate and cathode outputs of which are applied to the grids of amplifier tubes 30 and 32, respectively, to produce a pair of output voltages differing in phase with respect to each other by a hundred eighty degrees and being further ninety degrees shifted one hundred eighty degrees out of phase with respect to each other and which are applied from the plate circuits of these amplifier tubes to the horizontal deflection plates 11 and 12 of the cathode-ray tube 10, the voltages on the plates 11 and 12 being further shifted ninety degrees in phase with respect to the voltages appearing on plates 13 and 14.

If the input sweep voltages are constant amplitude sine waves shifted ninety degrees in phase with respect to each other, the cathode-ray tube beam will trace out a circle on the screen of the cathode-ray tube 10, the radius of the circle being dependent upon the level of the constant amplitude input sweep voltages. If the input sweep voltages, in addition to being shifted by ninety degrees, comprise trains of damped sine waves the beam trace will be a spiral having its origin either at the center or the periphery of the screen of the cathode-ray tube 10 depending upon whether the amplitude of the wave trains starts at a minimum or zero and increases to a maximum, or starts at a maximum and decreases toward zero, respectively. It will thus be seen that a curved trace on a cathode-ray tube screen can be accomplished by means of the circuit so far described without it being necessary to employ any special designed transformers or multigrid tubes and thus avoiding the difficulties encountered in the prior art constructions in this regard.

It will be noted that the cathodes of all of the amplifier tubes 24, 26, 30 and 32 are connected in common across a common bias resistor 38 to ground which thus maintains the cathodes at a desired bias voltage above ground and across the common cathode on resistor 38 there are connected a pair of input signal terminals 36 and 37 to which can be applied the curve deflecting signal which it is desired to display on the cathode-ray tube. The curve deflecting signal will vary the bias voltage on the cathodes of the amplifier tubes and will accordingly cause a variation in the instant resultant sweep voltages applied to the cathode-ray tube 10 to cause a radial deviation in the cathode-ray tube beam trace, which will thus make the desired signal visible on the cathode-ray screen with an amplified time base due to the curved trace of the beam. This means of modulating the sweep voltages does not involve any complications which would otherwise be introduced if the modulation were to be applied through the sweep voltage input circuits.

Having described a preferred embodiment of my invention I wish it to be understood that the circuit illustrated may be modified and equivalent elements substituted therefor without departing from the scope of the invention as defined in the appended claims.

I claim:

1. An improved circuit for imparting a radial displacement to a curved sweep of a cathode-ray tube beam, comprising a cathode-ray tube having two pairs of electron beam deflecting plates, a pair of circuit input terminals adapted to have respective input sweep voltages applied thereto with one of the input voltages shifted ninety degrees in phase with respect to the other input voltage, a pair of input triode vacuum tubes each having its grid connected to a respective one of said input terminals, a pair of amplifier tubes connected in the output circuit of each respective input tube to provide four amplifier tubes with their cathode electrodes joined to each other and applied to ground through a common bias resistor across which may be applied a modulating signal altering the cathode-ray tube presentation and one of said pair of amplifier tubes having its grid coupled to the plate of the associated input tube and the grid of the other amplifier tube of said pair of amplifier tubes being connected to the cathode of the associated input tube, the plates of each pair of amplifier tubes being connected to respective plates of one of the pairs of electron beam deflecting plates of the cathode-ray tube whereby each input sweep voltage is divided into a pair of voltages differing in phase by one hundred eighty degrees which voltages are applied to the respective plates of one of the pairs of deflection plates of the cathode-ray tube and the voltages applied to one of the pairs of deflecting plates differing in phase by ninety degrees with the corresponding voltages applied to the other pair of deflecting plates of the cathode-ray tube.

2. A cathode ray tube curved presentation radial deflector circuit, comprising a cathode ray tube plurality of cathode ray deflecting plates, a plurality of amplifiers corresponding in number to said plurality of cathode ray deflecting plates and each of said plurality of amplifiers having a cathode electrode connected directly to the cathode electrodes of the other of said amplifiers, a cathode bias resistor connected in common between the cathode electrodes of all of said amplifiers and ground, and modulating signal conducting means for deflecting the cathode ray tube presentation by the application of cathode ray tube modulating signal across said cathode bias resistor.

3. A cathode ray tube presentation modulating circuit, comprising a cathode ray tube having two pairs of cathode ray deflection plates, a first input tube having plate grid and cathode electrodes with means for impressing an electrical input at a predetermined phase on the grid of said first input tube, a second input tube having plate grid and cathode electrodes with means for impressing on said second input tube grid a second electrical input shifted in phase from the phase of the input to the grid of the first input tube, a separate grid actuated amplifier tube for each plate and for each cathode of said first and second input tubes and each amplifier tube having grid and cathode electrodes and a plate electrode from which the amplifier tube output is passed to a cathode ray deflecting plate of said cathode ray tube, and a common cathode bias resistor between ground and the connected cathodes of said amplifier tubes and modulating signal contact means whereby a cathode ray tube presentation may be deflected by applying a cathode ray tube presentation deflecting signal thereto.

4. A cathode ray tube modulation circuit, comprising a cathode ray tube having two pairs of deflection plates, a first input tube having plate grid and cathode electrodes, a first input tube resistor between the cathode and the grid electrodes of said first input tube, a first amplifier having a grid capacitively coupled with the plate electrode of said first input tube and having a plate capacitively coupled with a cathode ray tube first deflection plate and having a cathode, a second amplifier having a grid capacitively coupled with the cathode of said first input tube and having a plate capacitively coupled with a cathode ray tube second deflection plate and having a cathode, a second input tube having plate grid and cathode electrodes, a second input tube resistor between the cathode and the grid of said second input tube, a third amplifier having a grid capacitively coupled with the plate of said second input tube and having a plate capacitively coupled with a cathode ray tube third deflection plate and having a cathode, a fourth amplifier having a grid capacitively coupled with the cathode of said second input tube and having a plate capacitively coupled with a cathode ray tube fourth deflection plate and having a cathode, a common bias resistor connecting the cathodes of said four amplifiers to ground, and a modulating signal conductor referred to ground and connected to the junction of the four amplifier tube cathode electrodes for modifying the cathode ray trace of said cathode ray tube.

5. A radial modulator of a curved sweep on a cathode ray tube screen, comprising a cathode ray tube having a pair of vertical and a pair of horizontal cathode ray deflection plates, the radial modulator comprising a pair of signal input tubes receiving signal on the control grid of each tube and providing outputs from both the plate and from the cathode of each signal input tube, a first pair of amplifier tubes provided with plate grid and cathode electrodes and associated with one of said input tubes by having a first amplifier tube grid capacitively coupled with the plate of a first signal input tube and by having a first amplifier tube plate capacitively coupled with the first of a pair of vertical cathode ray deflection plates, and by having a second amplifier tube grid capacitively coupled with the cathode of the first signal input tube and the second amplifier tube plate capacitively coupled with the second of the pair of vertical cathode ray deflection plates, and a second pair of amplifier tubes provided with plate grid and cathode electrodes and with a third amplifier tube grid capacitively coupled with the plate of a second signal input tube and with a fourth amplifier tube grid capacitively coupled with the cathode of the second signal input tube, and the two plates of said third and fourth amplifier tubes capacitively coupled with the pair of horizontal cathode ray deflection plates, and an amplifier cathode bias resistor biasing to ground the four cathodes of the four amplifiers, and means for applying across the resistor biasing to ground the cathodes of said amplifiers a modulating signal for causing a radial deflection of a curved sweep on the cathode ray tube screen.

6. The modulator in the above claim 5 wherein capacitors are connected across the plate outputs of the pair of signal input tubes to reduce any grid-cathode coupling tending to unbalance the system.

References Cited in the file of this patent

UNITED STATES PATENTS

| | | |
|---|---|---|
| 2,421,312 | Bobb | May 21, 1947 |
| 2,471,516 | Bryant | May 31, 1949 |